(12) United States Patent
van Grieken et al.

(10) Patent No.: US 9,206,924 B2
(45) Date of Patent: Dec. 8, 2015

(54) STINGER FOR A PIPELINE LAYING VESSEL

(75) Inventors: Gerardus Cornelius van Grieken, Noordwijkerhout (NL); Maikel Hillenaar, Leiderdorp (NL); Timotheus Johannes Rutten, Oegstgeest (NL); Cornelis van Zandwijk, Waddinxveen (NL)

(73) Assignee: HEEREMA MARINE CONTRACTORS NEDERLAND SE, Leiden (NL)

( * ) Notice: Subject to any disclaimer, the term of this patent is extended or adjusted under 35 U.S.C. 154(b) by 0 days.

(21) Appl. No.: 13/980,102

(22) PCT Filed: Dec. 23, 2011

(86) PCT No.: PCT/NL2011/050895
§ 371 (c)(1),
(2), (4) Date: Sep. 16, 2013

(87) PCT Pub. No.: WO2012/102607
PCT Pub. Date: Aug. 2, 2012

(65) Prior Publication Data
US 2014/0044487 A1    Feb. 13, 2014

Related U.S. Application Data

(60) Provisional application No. 61/437,344, filed on Jan. 28, 2011.

(51) Int. Cl.
F16L 1/225  (2006.01)
F16L 1/19   (2006.01)

(52) U.S. Cl.
CPC .. *F16L 1/225* (2013.01); *F16L 1/19* (2013.01)

(58) Field of Classification Search
CPC ........... F16L 1/207; F16L 1/225; F16L 1/235; B63B 35/03
USPC ...................................... 405/154.1, 158, 166
See application file for complete search history.

(56) References Cited

U.S. PATENT DOCUMENTS 5,181,798 A   1/1993  Gilchrist, Jr.
6,273,643 B1  8/2001  Baugh

FOREIGN PATENT DOCUMENTS

| GB | 2462656 A    | 2/2010  |
| NL | 8303483 A    | 5/1985  |
| WO | 2007094655 A1| 8/2007  |
| WO | 2009148297 A1| 12/2009 |

*Primary Examiner* — Tara M. Pinnock
(74) *Attorney, Agent, or Firm* — Hoffmann & Baron, LLP

(57) ABSTRACT

A stinger (1) for a pipeline laying vessel, the stinger includes at least one track (3) which in use at least partly surrounds a firing line along which the pipeline (5) is laid, and at least one pipeline support (6) for supporting the pipeline, which pipeline support is movable along said track.

20 Claims, 17 Drawing Sheets

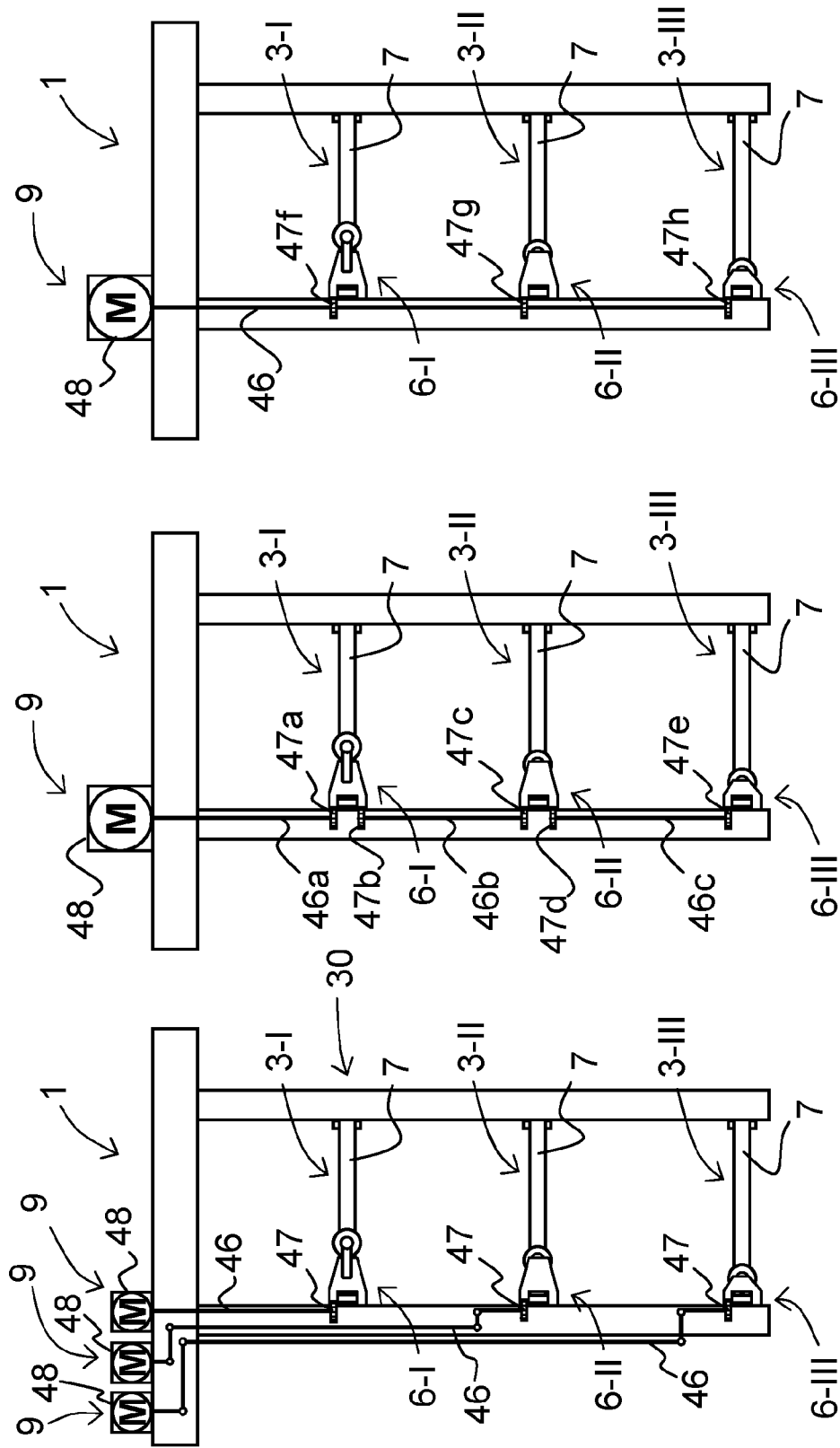

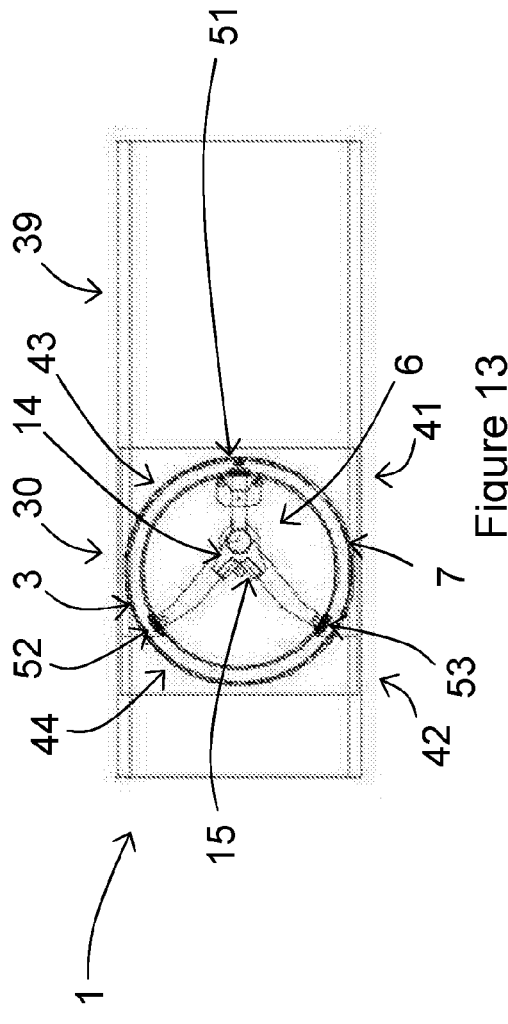
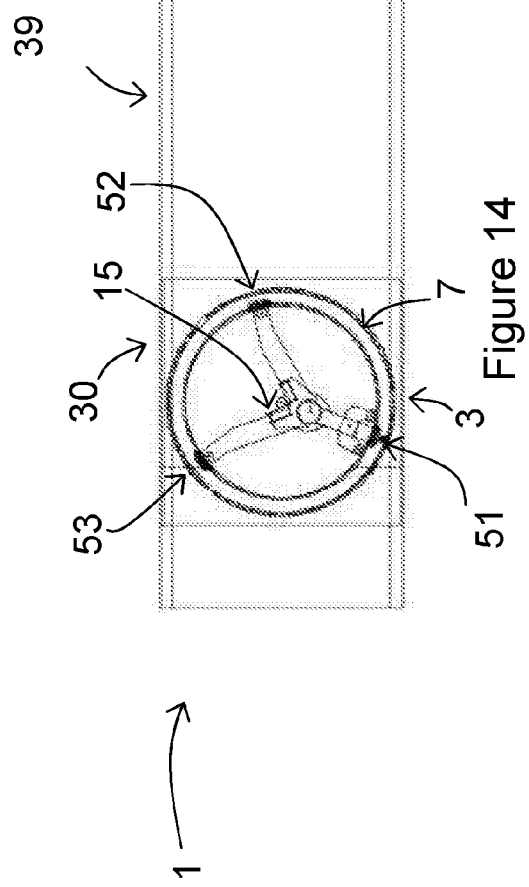

US 9,206,924 B2

STINGER FOR A PIPELINE LAYING VESSEL

CROSS-REFERENCE TO RELATED APPLICATIONS

This application is the National Stage of International Application No. PCT/NL2011/050895, filed Dec. 23, 2011, which claims the benefit of U.S. Provisional Application No. 61/437,344, filed Jan. 28, 2011, the contents of which is incorporated by reference herein.

FIELD OF THE INVENTION

The invention relates to a stinger for a pipeline laying vessel. The stinger comprises at least one track which in use at least partly surrounds a firing line along which the pipeline is laid, and at least one pipeline support for supporting the pipeline, which pipeline support is movable along said track.

The invention further relates to a pipeline laying vessel comprising a stinger according to the invention.

The invention further relates to a method for laying a pipeline with a pipeline laying vessel according to the invention.

SUMMARY OF THE INVENTION

In an embodiment the method according the invention comprises changing the orientation of the pipeline laying vessel in a horizontal plane while keeping the orientation of the pipeline substantially unchanged by moving the at least one pipeline support along its track.

The invention further relates to the use of a stinger according the invention.

The invention further relates to the use of a pipe laying vessel according the invention.

BRIEF DESCRIPTION OF THE DRAWINGS

The invention will be explained further in detail with reference to the accompanying drawings wherein.

DETAILED DESCRIPTION OF THE INVENTION

Figure 1:
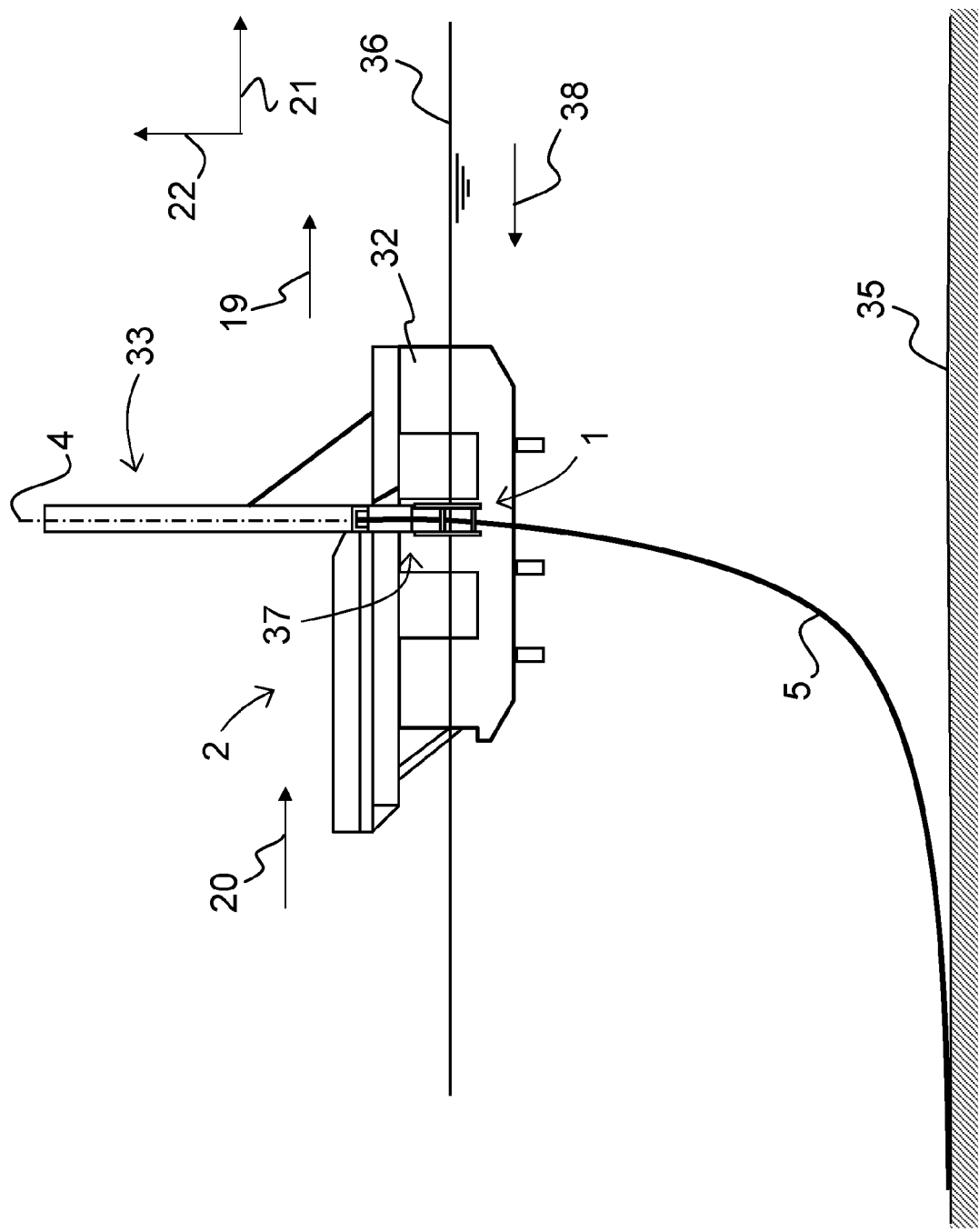
FIG. 1 schematically shows a side view of an embodiment of the pipeline laying vessel according to the invention, the FIGS. 2 and 3 schematically show a top view of the pipeline laying vessel of FIG. 1, FIG. 4 schematically shows a view in perspective of the stinger of the pipeline laying vessel of FIG. 1, FIG. 5 schematically shows a top view of the lower track and lower pipeline support of the stinger of FIG. 4, FIG. 6 schematically shows a view in perspective of the lower track and lower pipeline support of the stinger of FIG. 4, FIG. 7 schematically shows a top view of an alternative embodiment of an upper track and upper pipeline support of the stinger of FIG. 4, FIG. 8 schematically shows a view in perspective of an alternative embodiment an upper track and upper pipeline support of the stinger of FIG. 4, FIG. 9 schematically shows a top view of an alternative embodiment of a lower track and lower pipeline support of the stinger of FIG. 4, FIG. 10 schematically shows a view in perspective of an alternative embodiment a lower track and lower pipeline support of the stinger of FIG. 4, FIG. 11 schematically shows a side view of a further embodiment of the stinger according the invention comprising a separate drive for each pipeline support, the FIGS. 12a and 12b schematically show a side view of two further embodiments of the stinger according the invention comprising one drive for all the pipeline supports, the FIGS. 13-15 schematically show a top view of a further embodiment of a stinger according the invention, the FIGS. 16 and 17 schematically show a view in cross section of a further embodiment of a stinger according the invention, and the FIGS. 18 and 19 schematically show a view in cross section of a further embodiment of a stinger according the invention.
Figure 4:
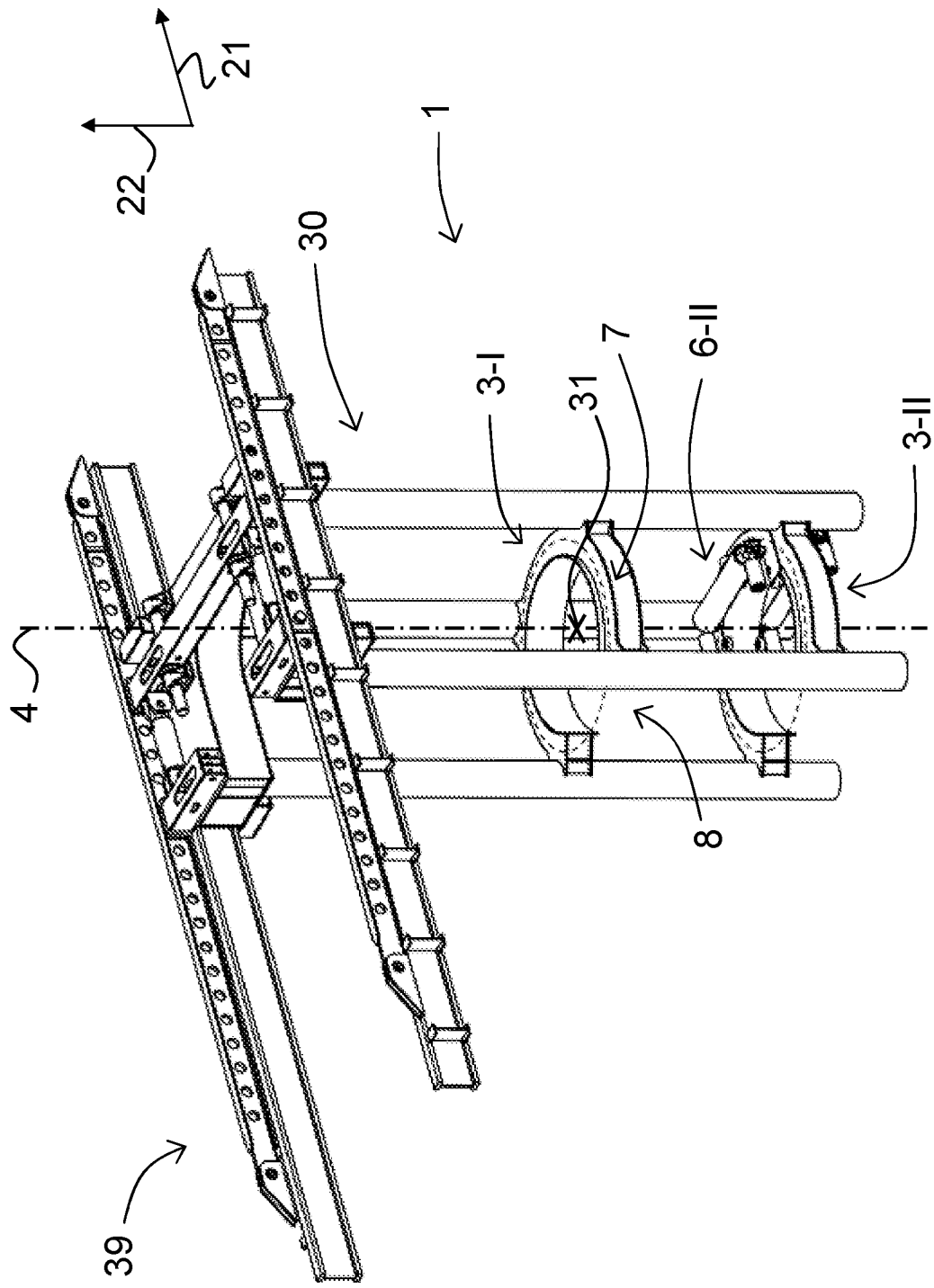

FIG. 1 shows a side view of an embodiment of the pipeline laying vessel according to the invention. The pipeline laying vessel 2 is configured and constructed for laying a pipeline 5 and comprises a stinger 1 for guiding the pipeline 5. An enlarged view of the stinger 1 is shown in FIG. 4.

The pipeline laying vessel 2 comprises a hull 32 for providing buoyancy to the pipeline laying vessel 2 when positioned in water 36. A tower assembly 33 extending upwardly from the hull 32 is provided for supporting a part of the pipeline 5 which is to be laid along the firing line 4. The tower assembly 33 extends substantially vertical. The arrow 22 indicates a vertical direction and the arrow 21 indicates a horizontal direction. The arrow 20 indicates the orientation of the pipeline laying vessel 2 in a horizontal plane.

The stinger 1 is located at the lower part 37 of the tower assembly 33. The stinger 1 and the tower assembly 33 are positioned substantially in line with each other. The pipeline 5 is suspending from the pipeline laying vessel 2 to the seabed 35. The pipeline 5 extends through the stinger 1. The arrow 19 indicates the direction in which the pipeline 5 is laid.

Figure 2:
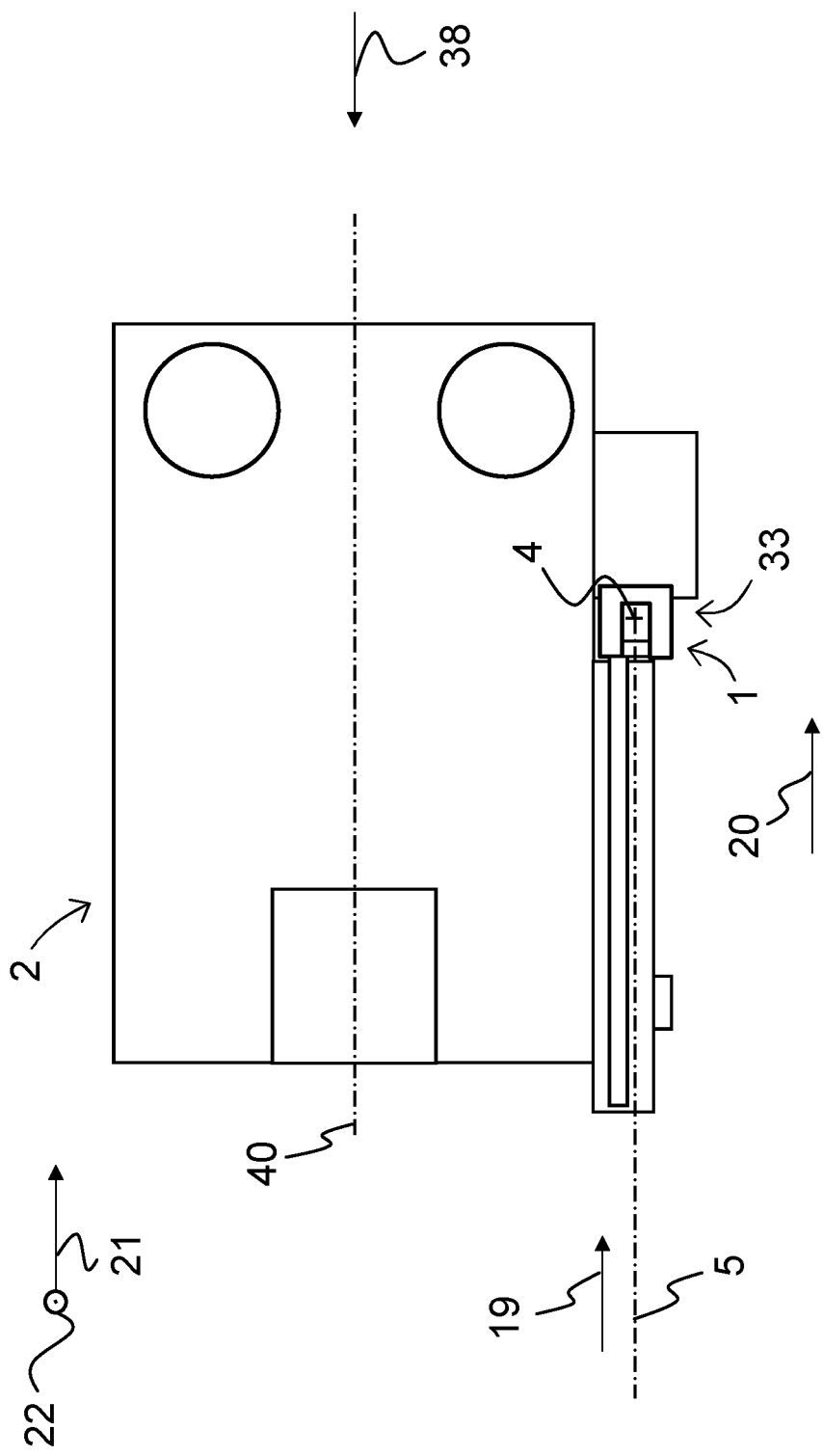
Figure 3:
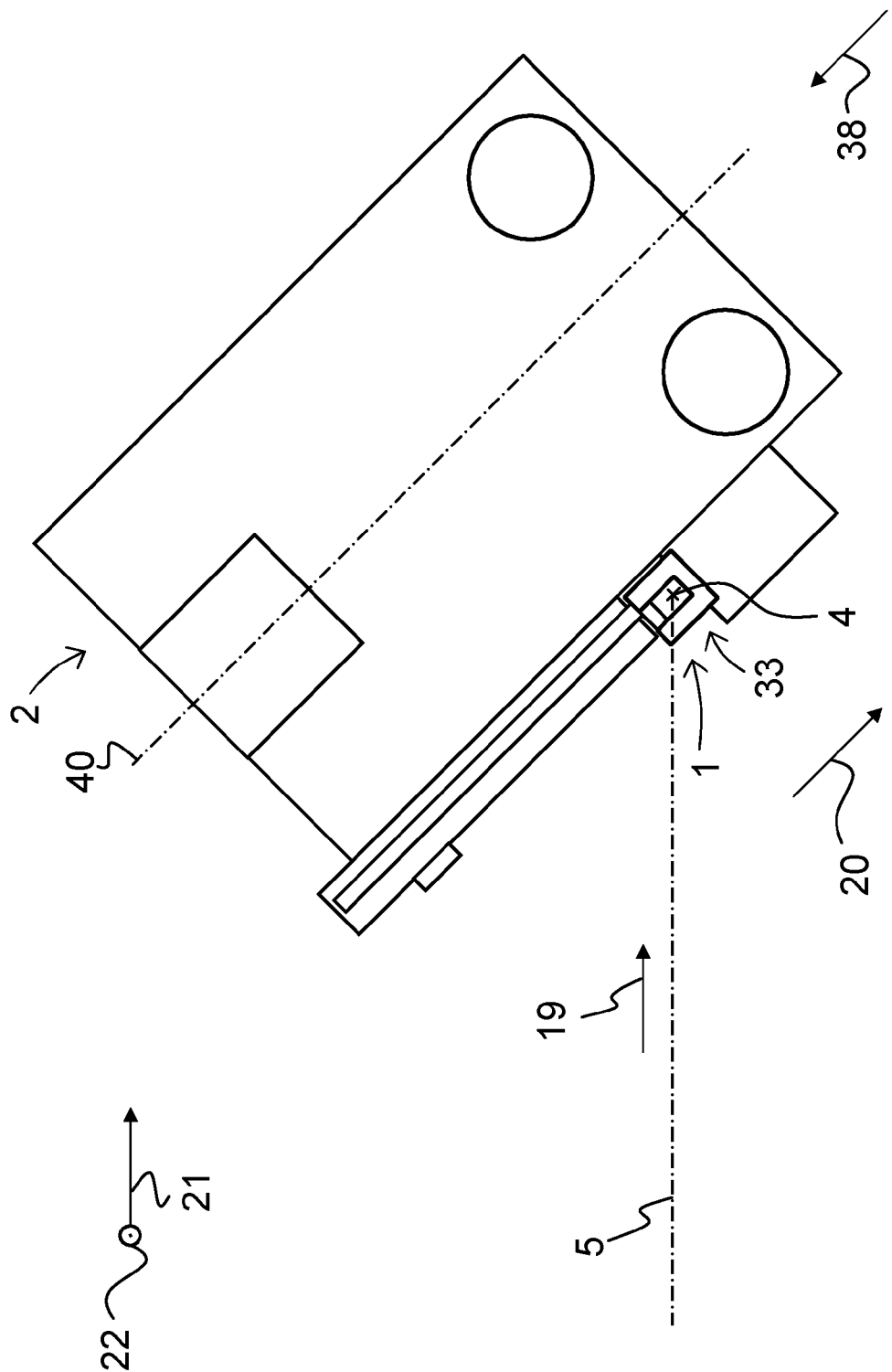

The FIGS. 2 and 3 show a top view of the pipeline laying vessel of FIG. 1. The horizontal and vertical are again indicated by the arrows 21 and 22, respectively. The pipeline 5 which is laid in the laying direction 19 is schematically shown by discontinuous lines.

Normally, a pipeline laying vessel 2 is oriented with its main longitudinal axis 40 parallel to the lay direction 19. This situation is shown in FIG. 2. However, a pipeline laying vessel 2 is generally sensitive for currents, waves and winds. When currents, waves and/or wind approach the vessel 2 from a direction 38 which makes a substantial angle with the main longitudinal axis 40 of the vessel 2, it may become difficult, in particular for a dynamic positioning system (DP-system), to maintain the position of the vessel 2. In such circumstances, it may be advantageous to rotate the pipeline laying vessel 2 about a vertical axis 22 during pipeline laying in order to reduce the forces from wind, waves and currents on the vessel in order to maintain the vessels position.

In FIG. 3 the orientation 20 of the pipeline laying vessel 2 in the horizontal plane is changed such the pipeline laying vessel 2 is positioned in line with the direction 38 of the wind, waves and/or currents. This changing of the orientation 20 of the pipeline laying vessel 2 is often referred to as weathervaning.

When the tower assembly 33 can not pivot in all directions, which in general is the case, weathervaning during pipelay operations is only possible when the tower assembly 33 extends vertical. The stinger 1 is in said situation used to bend the pipeline 5 from a vertical orientation in the tower assembly 33 into a specific departure angle when leaving the stinger 1. The departure angle depends on the water depth and the forces exerted on the pipeline 5 by the pipeline laying vessel 2.

A stingers which allows weathervaning is known from WO2007094655. Said known stinger comprises multiple rollers surrounding the firing line. A drawback of said stinger is that a pipeline (or a wire) passing through the stinger has a tendency to settle in the areas where the rollers meet. This in general leads to undesired loading conditions and/or excessive wear and tear.

A further drawback of said known stinger is that it is difficult to lower a bulky item to the seabed.

The orientation 20 of the pipeline laying vessel 2 is often referred to as the heading of the pipeline laying vessel 2.

The orientation 20 of the pipeline laying vessel 2 is changed without changing the orientation of the pipeline 5. From the FIGS. 2 and 3 one can see that the laying direction 19 of the pipeline 5 is unchanged.

FIG. 4 shows the stinger of the pipeline laying vessel of FIG. 1. The stinger 1 comprises an upper track 3-I and lower track 3-II which surround the firing line 4 along which the pipeline 5 is laid. The stinger 1 further comprises an upper pipeline support 6-I (not shown) and lower pipeline support 6-II for supporting the pipeline 5. The pipeline supports 6 are movable along their tracks 3.

The stinger 1 allows the pipeline laying vessel 2 to perform a method of changing the orientation of the vessel 2 in a horizontal plane while keeping the orientation of the pipeline 5 substantially unchanged by moving the pipeline supports 6 along its tracks 3.

The pipeline supports 6 and their movability along their tracks 6 makes it possible to continuously optimize the support of pipeline supports 6 to the pipeline 5 when the orientation 20 of the vessel 2 is changed.

The tracks 3 fully surround the firing line 4. The pipeline supports 6 are movable 360° around the firing line 4. The tracks 3 comprise a substantially circular form. Each track 3 defines a track centre 31.

In a different embodiment of the stinger 1, the tracks 3 may be configured and constructed to partly surround the firing line 4. The pipeline supports 6 may be movable around the firing line 4 for less than 360°. The track 3 is the path along which the pipeline support 6 travels. Each track 3 is formed by a rail 7 partly surrounding the firing line 4. The rails 7 comprise an opening 8 which in use forms a passage for the pipeline 5. The rails 7 comprise a substantially circular form. When moving 360° around the firing line 4, the pipeline support 6 will be moved along the track 3 and over the opening 8. The rail 7 supports the pipeline support 6 when travelling along its track 3. The pipeline supports 6 may be freely movable along the tracks 3. The pipeline support 6 may be moved along their track 3 by the forces of the pipeline exerted on the pipeline support 6.

The stinger may comprise a drive 9 for driving the pipeline supports 6 along the tracks 3 (see also FIG. 7-12).

The tracks 3 are located at a distance from each other along the firing line 4. The tracks 3 are located in line with each other. The tracks 3 are held in position by a base frame 30. The base frame 30 is movably connected a support rail 39. This allows the stinger 1 to be positioned in a first stinger position in which the stinger 1 surrounds the firing line 4 (as shown in FIG. 4) and a second stinger position in which the stinger is located at a distance from the firing line 4. The positioning of the stinger 1 in the second stinger position allows the vessel 2 for example to lower a bulky item to the seabed 35.

Figure 5:
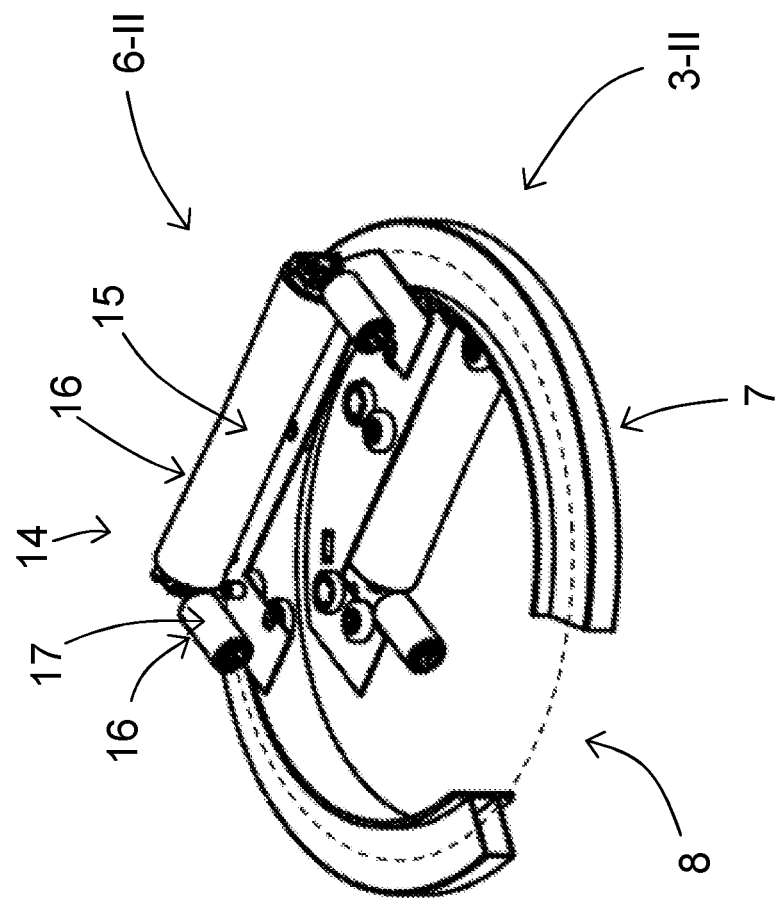
Figure 6:
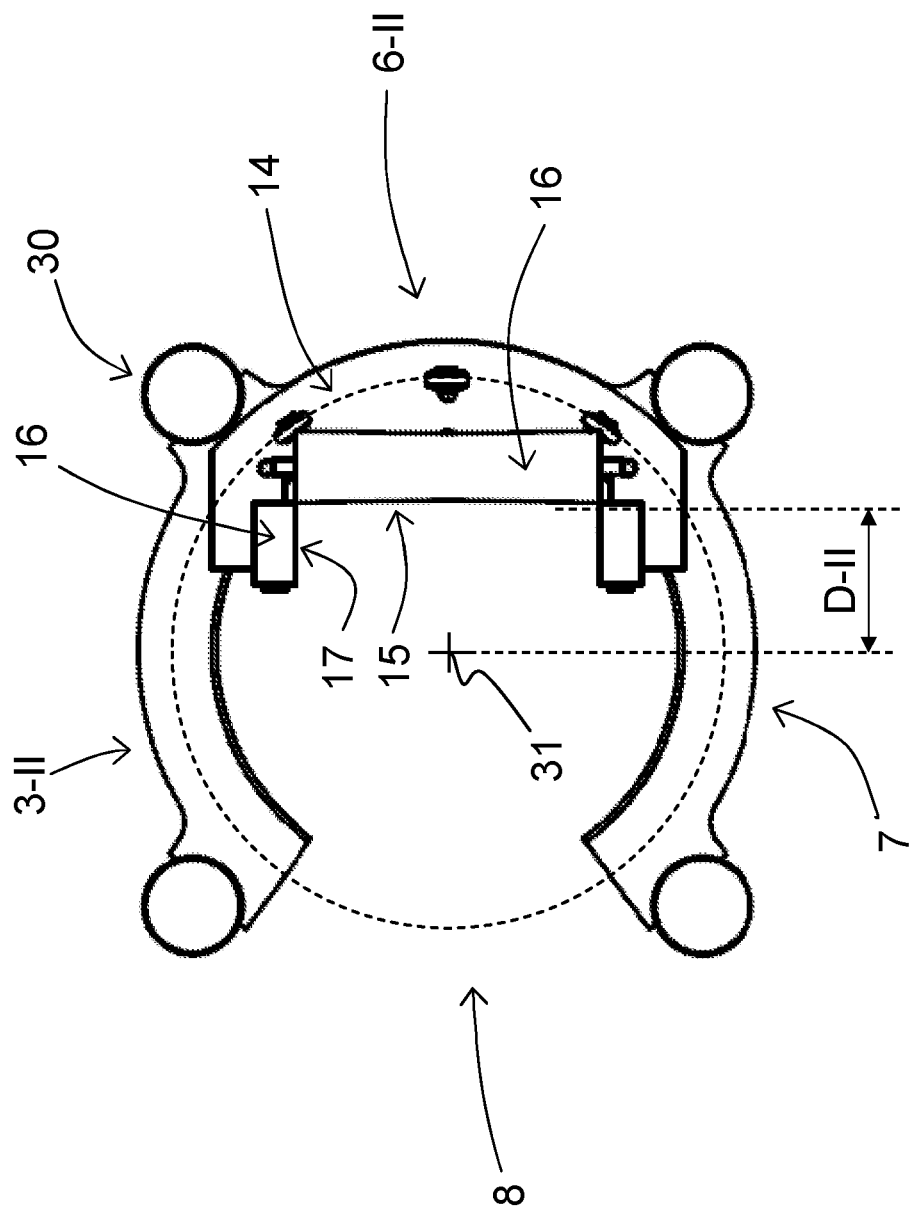

The FIGS. 5 and 6 show the lower track and lower pipeline support of the stinger of FIG. 4. The lower pipeline support 6-II comprise a pipeline guide 14 for guiding the pipeline 5. The pipeline guide 14 comprises a guiding surface 15 which in use is in contact with the pipeline 5. The guiding surface 15 is formed by two parallel extending rollers 16. Said rollers 16 forming the guiding surface 15 are located at a distance from each other.

In a different embodiment, the guiding surface 15 may be formed by one roller 16.

In a different embodiment, the guiding surface 15 may be formed by more than two parallel extending rollers 16.

The pipeline guide 14 in use partly surrounds the pipeline 5. The pipeline guide 14 comprises two retaining surfaces 17 which are located at a distance from each other at opposite ends of the guiding surface 15 and extending traverse to the guiding surface 15. Each of the retaining surfaces 17 is formed by two parallel extending rollers 16. Said rollers 16 forming the retaining surface 17 are located at a distance from each other.

The pipeline guide 14 may be configured and constructed such that the guiding surface 15 and the two retaining surfaces 17 are formed by two surfaces extending traverse to each other. Said two surfaces in use partly surround the pipeline 5. This is advantageous for retaining the pipeline 5.

The stinger 1 is configured and constructed to move the pipeline supports 6 along the tracks 3 such that in use the pipeline guides 14 are extending substantially perpendicular to the laying direction 19 of the pipeline 5.

The stinger 1 is configured and constructed to move the pipeline supports 6 along the tracks 3 such that in use the pipeline guides 14 remain extending substantially perpendicular to the laying direction 19 of the pipeline 5 when the orientation 20 of the pipe laying vessel in a horizontal plane is changed.

The stinger 1 is configured and constructed to move the pipeline supports 6 along the tracks 3 such that in use the guiding surfaces 15 are extending substantially perpendicular to the laying direction 19 of the pipeline 5.

The stinger 1 is configured and constructed to move the pipeline supports 6 along the track 3 such that in use the guiding surfaces 15 remain extending substantially perpendicular to the laying direction 19 of the pipeline 5 when the orientation 20 of the pipeline laying vessel 2 in a horizontal plane is changed.

Figure 7:
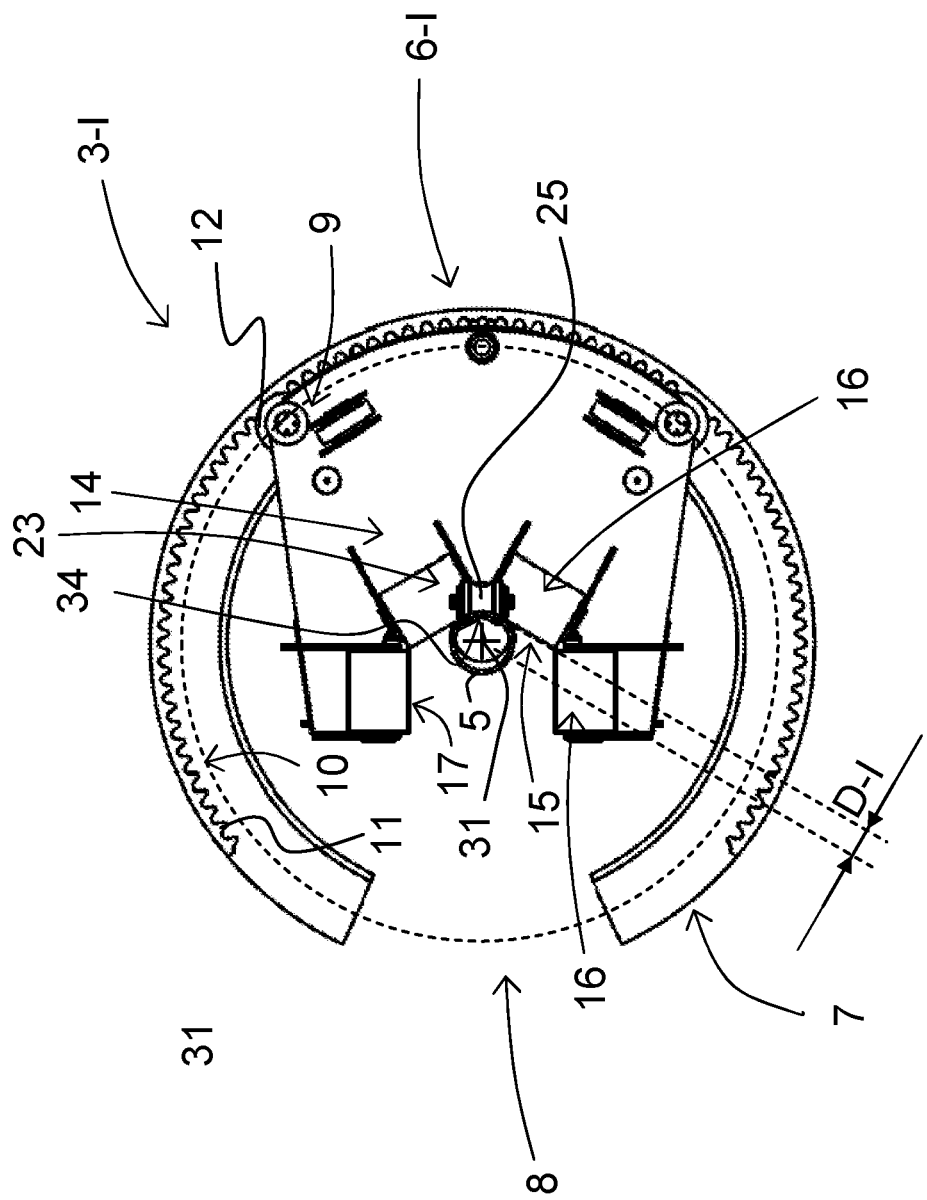
Figure 8:
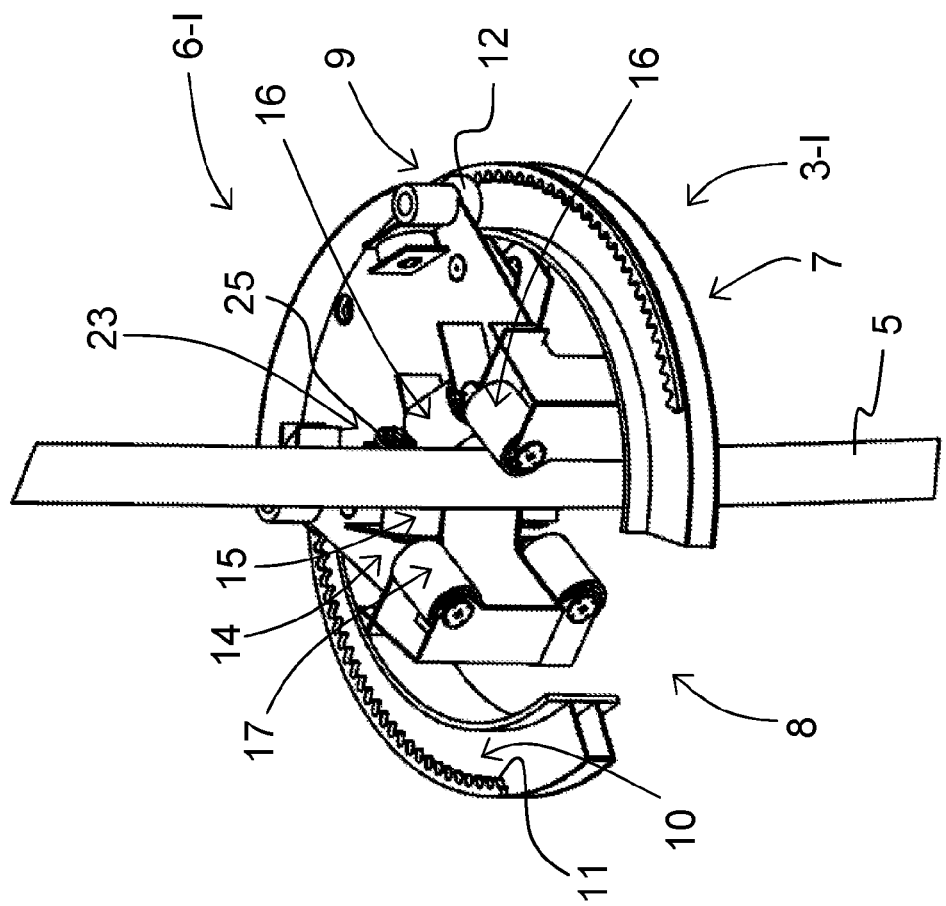
Figure 9:
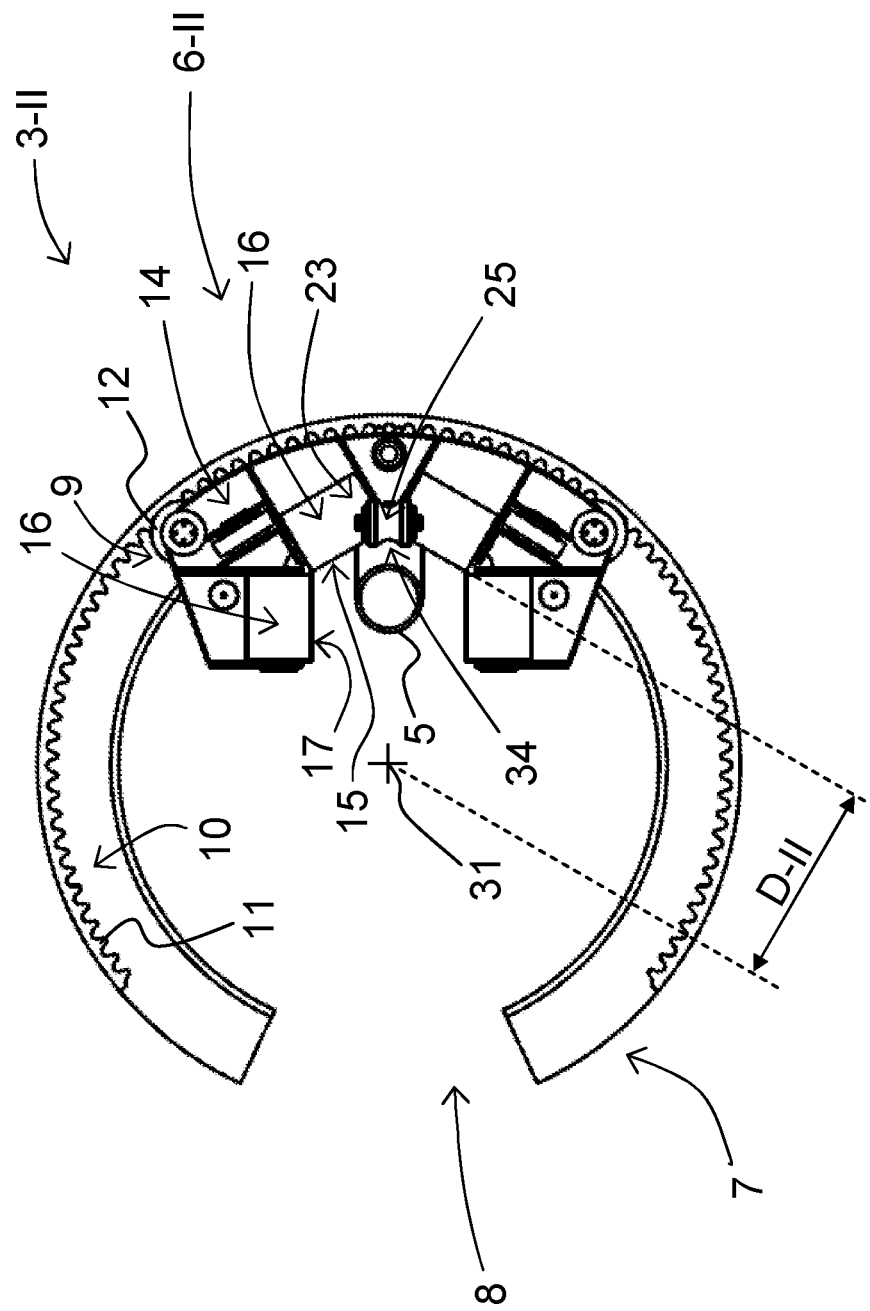
Figure 10:
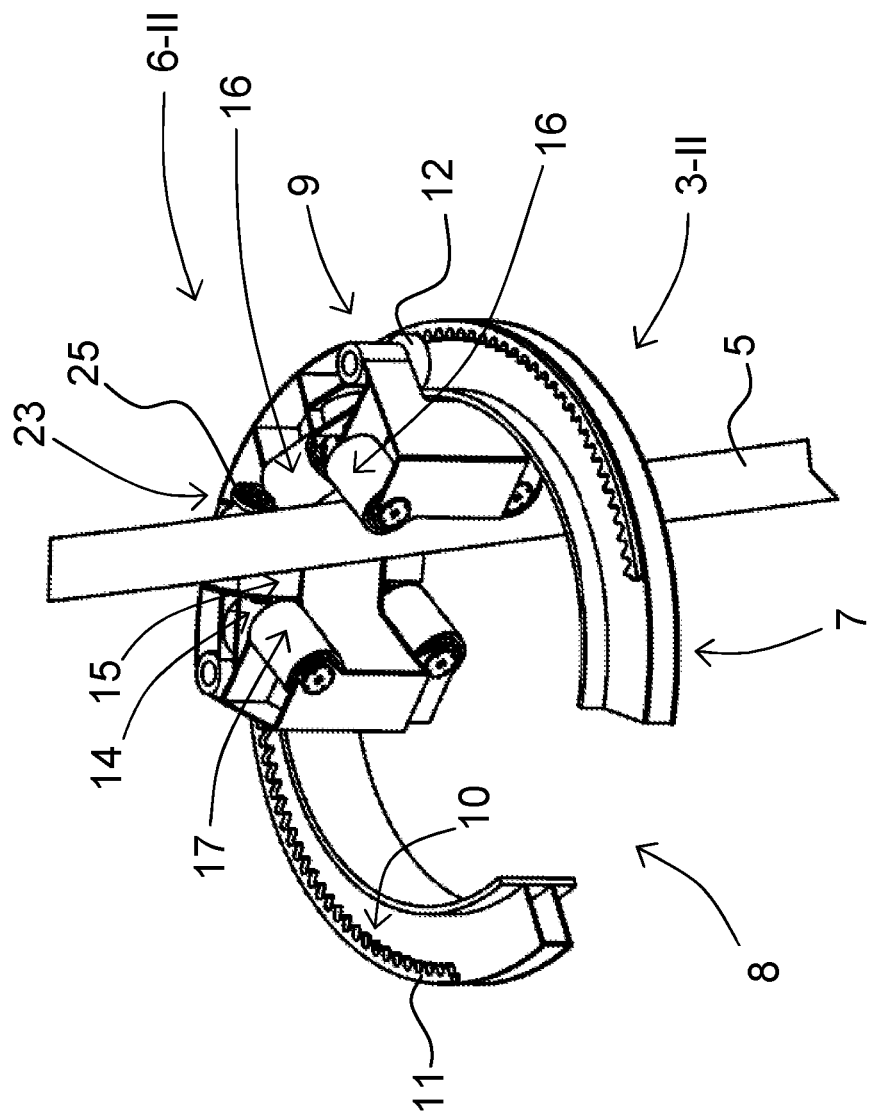

The FIGS. 7 and 8 show an alternative embodiment of the upper track and upper pipeline support of the stinger of FIG. 4 The FIGS. 9 and 10 show a corresponding alternative embodiment of the lower track and lower pipeline support of the stinger of FIG. 4, The guiding surface 15 is formed by two pairs of rollers 16 extending traverse to each other. Said pair of rollers 16 extend parallel and are located at a distance from each other.

The pipeline support 14 comprises a line guide 23 for guiding a line. The line guide 23 comprises a line guiding surface 34 which in use is in contact with the line. The line guiding surface 34 is formed by a rotatable disc 25.

The pipeline support 14 is configured and constructed to move the line guide 23 towards and away from the track centre 31 for moving the line guide 23 from a non-operative position into a operative position, and vice versa. The line supported by the line guide 23 may be part of an abandonment and recovery (A&R) system.

The stinger 1 is configured and constructed to move the pipeline supports 6 along the track 3 such that in use the line guiding surface 34 is extending substantially perpendicular to the laying direction 19 of the pipeline 5.

The stinger is configured and constructed to move the pipeline support 6 along the track 3 such that in use the line guiding surface 34 remains extending substantially perpendicular to the laying direction 19 of the pipeline 5 when the orientation of the pipeline laying vessel 2 in a horizontal plane is changed.

The distance D-I between the pipeline guide 14 of the upper pipeline support 6-I and its track centre 31 is smaller than the distance D-II between the pipeline guide 14 of an lower pipeline support 6-II and its track centre 31.

The distance D-I between the guiding surface 15 of the upper pipeline support 6-I and its track centre 31 is smaller than the distance D-II between the guiding surface 15 of an lower pipeline support 6-II and its track centre 31.

The pipeline supports 6 are configured and constructed to adjust the distance D-I, D-II between the pipeline guides 14 and their track centre 31. The pipeline supports 6 are configured and constructed to move the pipeline guides 14 towards and away from their track centre 31. The pipeline supports 6 are configured and constructed to adjust the distance D-I, D-II between the guide surfaces 15 and their track centre 31.

The rails 7 comprise engage members 10 positioned along the track 3 and the drive 9 is configured and constructed to move the pipeline supports 6 by engaging the engage members 10. The engage members 10 form a toothed rack 11 and the drive 9 comprises a corresponding toothed wheel 12. The toothed rack 11 and the toothed wheel 12 operate like a rack drive.

FIG. 11 shows an further embodiment of the stinger according the invention. The stinger 1 comprising three tracks 3 and three pipeline supports 6. Each pipeline support 6 is driven along its track 3 by a separate drive 9. A gear 47 is used to move the pipeline supports 6 along their tracks 3. Each gear 47 is driven by a separate motor 48 via a drive shaft 46. Other methods of driving are possible as well.

The FIGS. 12a and 12b show two further embodiments of the stinger according the invention. Both stingers 1 comprising one drive 9 for driving all the pipeline supports 6 along their track 3. In the embodiment of FIG. 12a, a first gear 47a is driven by a motor 48 via a first drive shaft 46a. This causes the first pipeline support 6-I to move along its track 3-I. This movement in turn causes the second gear 47b and third gear 47c to rotate, which gears 47b, 47c are interconnected by the second drive shaft 46b. Rotation of the third gear 47c causes the second pipeline support 6-II to move along its track 3-II. In a similar fashion the third pipeline support 6-III is moved along its track 3-III via the fourth gear 47d and the fifth gear 47e interconnected by the third driveshaft 46c.

An alternative embodiment is shown in FIG. 12b, where three gears 47f, 47g and 47h are all driven via a single continuous drives haft 46 driven by one motor 48.

Figure 15:
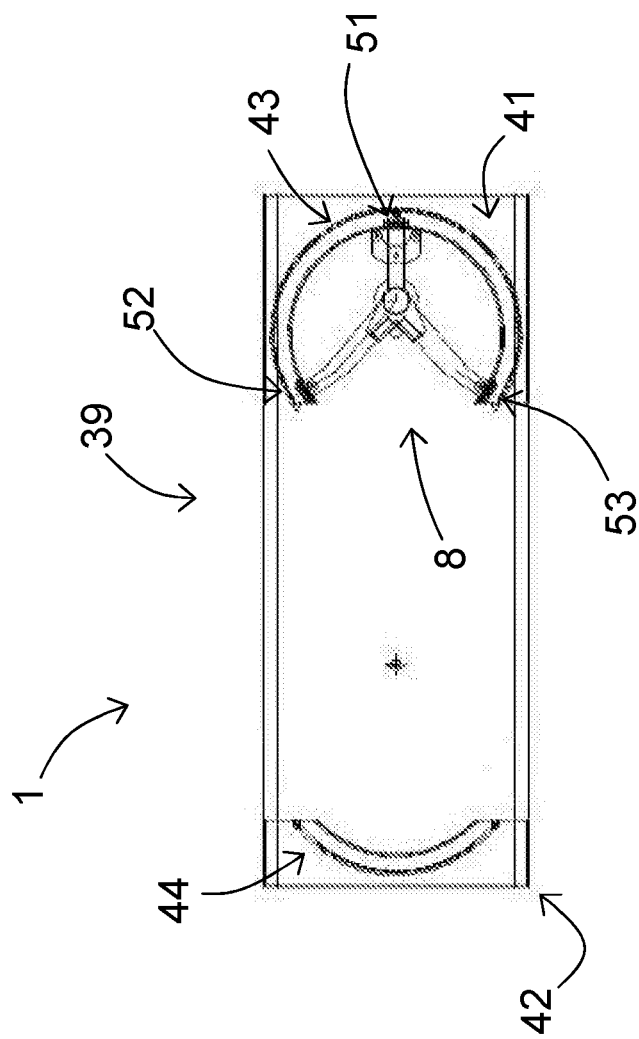

The FIGS. 13-15 show a further embodiment of a stinger according the invention. The stinger 1 comprises a base frame 30 which holds the tracks 6 in position. The base frame 30 is movably connected to a support rail 39. The support rail 39 corresponds to the one shown in FIG. 4. The base frame 30 comprises a first base frame part 41 and a second base frame part 42. The track 3 is formed by a rail 7 comprising a first rail part 43 and a second rail part 44. The first base frame part 41 holds the first rail part 43 in position and the second base frame part 42 holds the second rail part 44 in position. The first base frame part 41 and the second base frame part 42 are movable relative to each other along the support rail 39. This way the first rail part 43 and the second rail part 44 can be moved relative to each other.

In the FIGS. 13 and 14, the first base frame part 41 and second base frame part 42 are joined to form a rail 7 fully surrounding the firing line 4. In said situation, the stinger 1 is positioned in the first stinger position. In FIG. 15, the first base frame part 41 and second base frame part 42 are located at a distance from each other to form an opening 8. In said situation, the stinger 1 is positioned in the second stinger position.

The pipeline support 6 comprises three contact points 51, 52, 53 in which the pipeline support 6 is supported by the rail 7. When the first base frame part 41 and second base frame part 42 are joined, the pipeline support 6 is able to rotate 360° around the firing line 4. The contact points 51, 52, 53 are located at a distance from each other along the rail 7.

Figure 16:
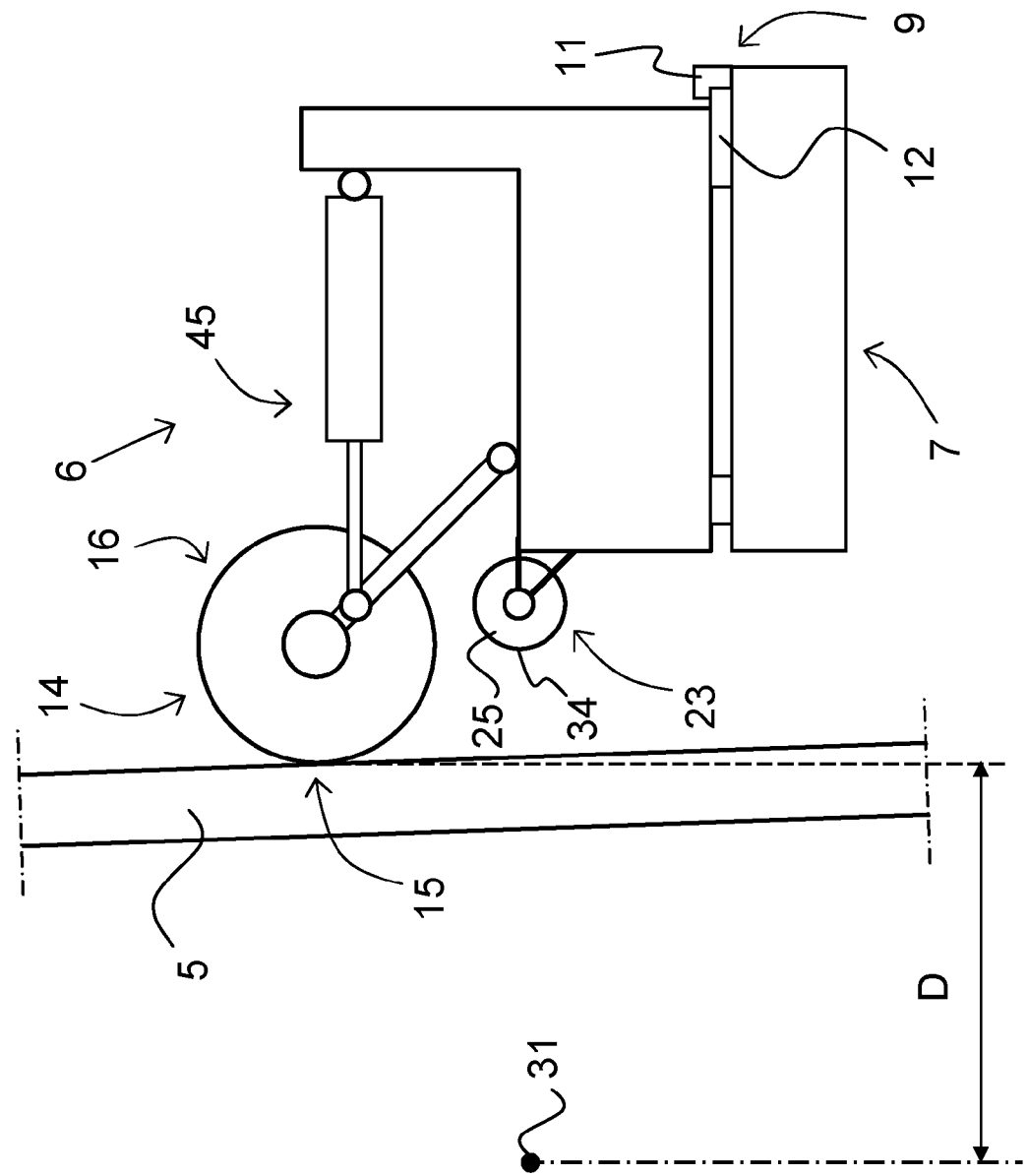
Figure 17:
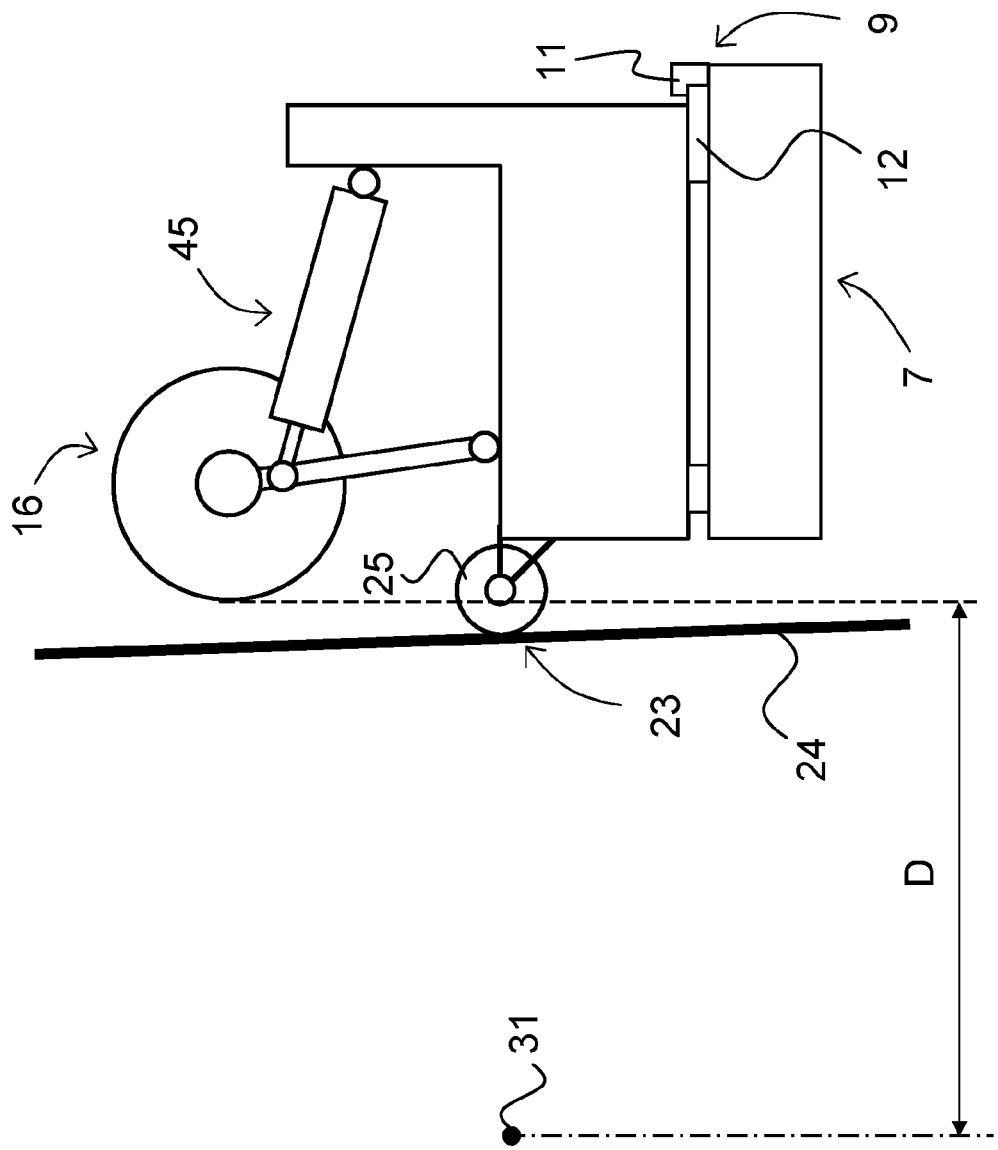

The FIGS. 16 and 17 show a further embodiment of the stinger according the invention. The view is a cross section through the rail 7, pipeline support 6 and pipeline 5. The pipeline support 6 is configured and constructed to adjust the distance D between the pipeline guide 14 and its track centre 31. The pipeline support 6 is configured and constructed to move the pipeline guide 14 towards and away from its track centre 31. The pipeline support 6 is configured and constructed to adjust the distance D between the guide surface 15 and its track centre 31.

The pipeline support 6 comprises a guide position device 45 for moving the pipeline guide 14. The guide position device 45 comprises a hydraulic cylinder, but also different types of devices for positioning the pipeline guide 14 may be used.

In FIG. 16 the pipeline guide 14 is positioned in a first pipeline guide position in which the pipeline guide 14 in use is in contact with the pipeline 5.

In FIG. 17 the pipeline guide 14 is positioned in a second pipeline guide position in which the pipeline guide 14 in use is located at a distance from the pipeline 5.

The pipeline support 6 comprises a line guide 23. When the pipeline guide 14 is positioned in the second pipeline guide position, the distance between the line guide 23 and the track centre 31 is smaller than the distance between the pipeline guide 14 and the track centre 31. This way a line 24 can be guided by the line guide 23 when the pipeline guide 14 is located in the second pipeline guide position. In FIG. 17, the line guiding surface 34 of a rotatable disc 25 forming a line guide 23 is in contact with a line 24.

The movability of the pipeline guide 14 allows the passage of a pipeline part and/or an added item having a larger diameter than the pipeline 5. In such a situation, the pipeline guide 14 will be moved away from the track centre 31 by the forces of said pipeline part and/or added item working on the pipeline guide 14. The guide position device 45 is configured and constructed to provide a resistance against such a movement away from the track centre and to move the pipeline guide 14 back towards the track centre 31 once said pipeline part and/added item has passed. The guide position device 45 is configured and constructed to continuously push the pipeline guide 14 against the pipeline 5 with a specific force. When the forces of the pipeline 5 working on the pipeline guide 14 exceed said specific force of the guide position device 45 (for example when said pipeline part and/or added item passes), the pipeline guide 14 will move away from the track centre 31 while still exerting its specific force on the pipeline 5.

Figure 18:
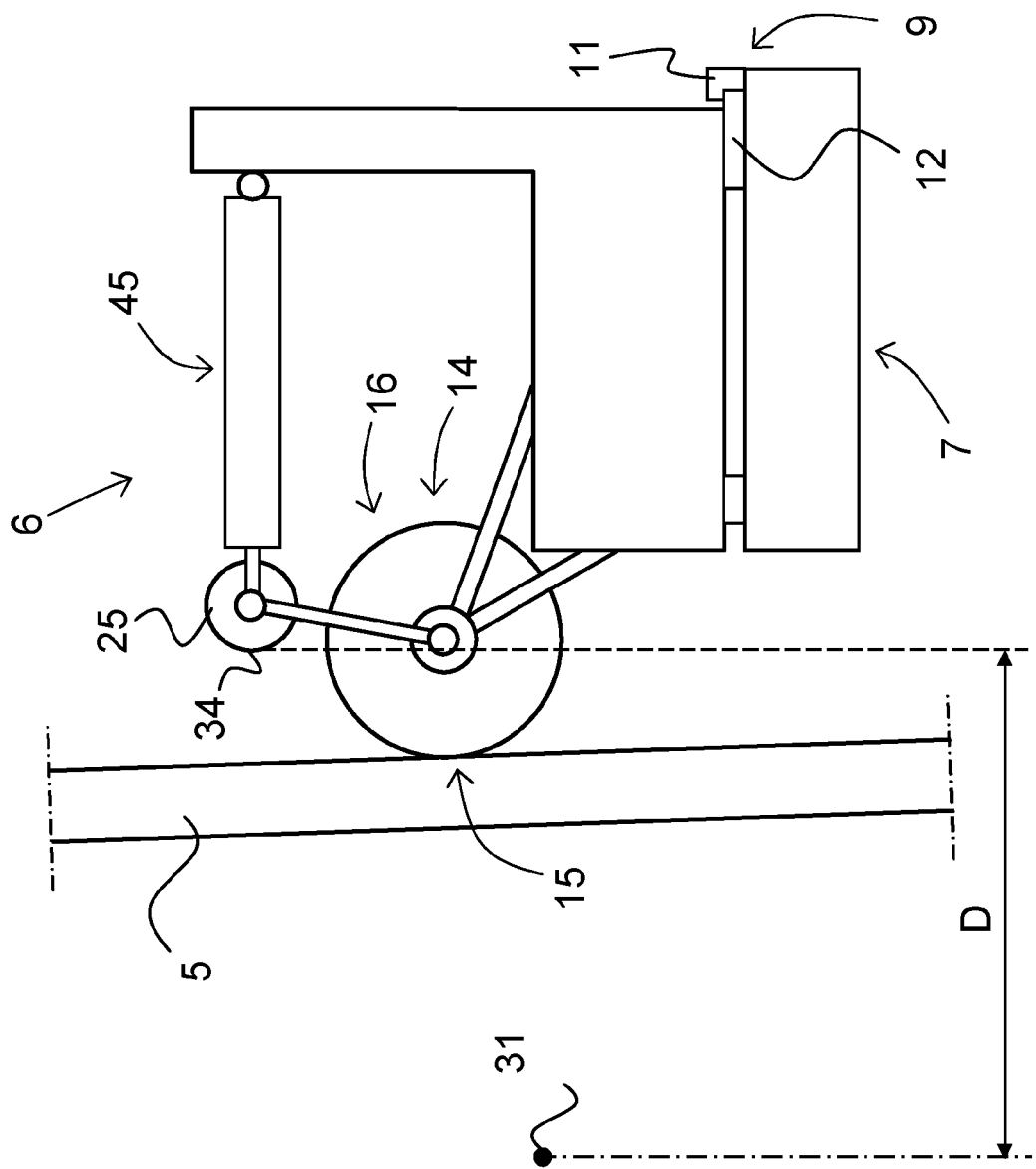
Figure 19:
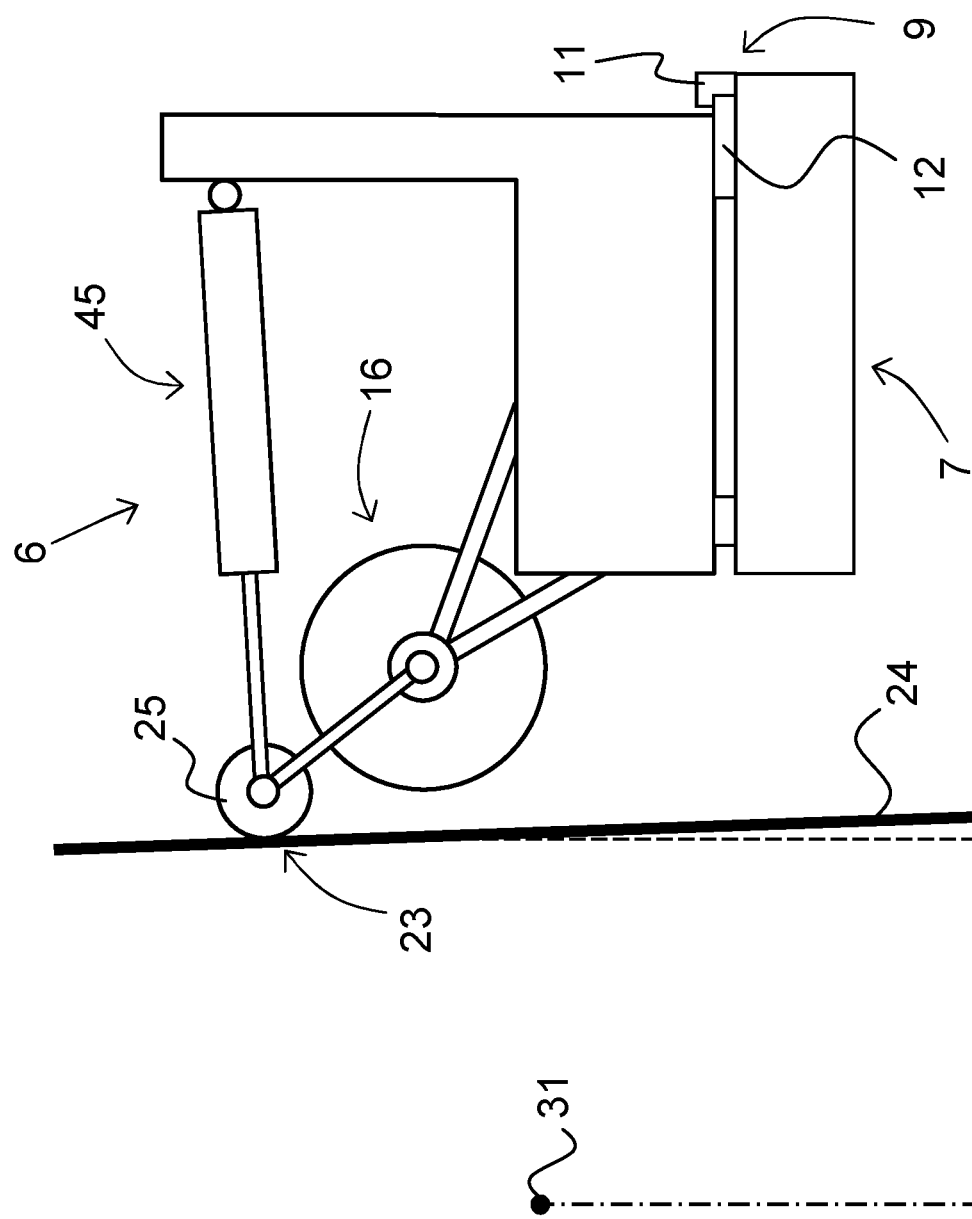

The FIGS. 18 and 19 show a further embodiment of a stinger according the invention. The view is a cross section through the rail 7, pipeline support 6 and pipeline 5. The pipeline support 6 is configured and constructed to adjust the distance D between the line guide 23 and its track centre 31. The pipeline support 6 is configured and constructed to move the line guide 23 towards and away from its track centre 31. The pipeline support 6 is configured and constructed to adjust the distance D between the line guiding surface 34 and its track centre 31.

The pipeline support 6 comprises a guide position device 45 for moving the line guide 23. The guide position device 45 comprises a hydraulic cylinder, but also different types of devices for positioning the line guide 23 may be used.

In FIG. 18 the line guide 23 is positioned in a first line guide position in which the line guide 23 in use is located at a distance from the pipeline 5.

In FIG. 19 the line guide 23 is positioned in a second line guide position in which the line guide 23 in use is in contact with the line 24.

When the line guide 23 is positioned in the first line guide position, the distance between the pipeline guide 14 and the track centre 31 is smaller than the distance between the line guide 23 and the track centre 31. This way a pipeline 5 can be guided by the pipeline guide 14 when the line guide 23 is located in the first line guide position. In FIG. 19, the line guiding surface 34 of a rotatable disc 25 forming the line guide 23 is in contact with the line 24.

The following clauses provide a further description of the stinger, pipeline laying vessel and method according to the invention.

1. Stinger for a pipeline laying vessel, the stinger comprising;
   at least one track which in use at least partly surrounds a firing line along which the pipeline is laid, and
   At least one pipeline support for supporting the pipeline, which pipeline support is movable along said track.
2. Stinger according to any of the preceding clauses, wherein the track fully surrounds the firing line.
3. Stinger according to any of the preceding clauses, wherein the pipeline support is movable 360° around the firing line.
4. Stinger according to any of the preceding clauses, wherein the track partly surrounds the firing line.
5. Stinger according to any of the preceding clauses, wherein the pipeline support is movable around the firing line for less than 360°.
6. Stinger according to any of the preceding clauses, wherein the track comprises a substantially circular form.
7. Stinger according to any of the preceding clauses, wherein the track is formed by a rail at least partly surrounding the firing line.
8. Stinger according to any of the preceding clauses, wherein the rail comprises an opening to in use form a passage for the pipeline.
9. Stinger according to any of the preceding clauses, wherein the track is formed by a rail fully surrounding the firing line.
10. Stinger according to any of the preceding clauses, wherein the rail comprises a first rail part and a second rail part which are movable relative to each other.
11. Stinger according to any of the preceding clauses, wherein the rail comprises a substantially circular form.
12. Stinger according to any of the preceding clauses, wherein the stinger comprises multiple tracks comprising a pipeline support.
13. Stinger according to any of the preceding clauses, wherein the stinger comprises a drive for driving the pipeline support along the track.
14. Stinger according to any of the preceding clauses, wherein the stinger comprises a drive for driving more than one pipeline support along the tracks.
15. Stinger according to any of the preceding clauses, wherein the stinger comprises a drive for driving all the pipeline supports along the tracks.
16. Stinger according to any of the preceding clauses, wherein the stinger comprises a separate drive for each pipeline support.
17. Stinger according to any of the preceding clauses, wherein the rail comprises engage members positioned along the track and the drive is configured and constructed to move the pipeline supports by engaging the engage members.
18. Stinger according to any of the preceding clauses, wherein the engage members form a toothed rack and the drive comprises a corresponding toothed wheel.
19. Stinger according to any of the preceding clauses, wherein the pipeline support is substantially freely moveable along the track.
20. Stinger according to any of the preceding clauses, wherein the pipeline support comprise a pipeline guide for guiding the pipeline.
21. Stinger according to any of the preceding clauses, wherein the pipeline guide comprises a guiding surface which in use is in contact with the pipeline.
22. Stinger according to any of the preceding clauses, wherein the guiding surface is formed by at least one roller.
23. Stinger according to any of the preceding clauses, wherein the pipeline guide in use at least partly surrounds the pipeline.
24. Stinger according to any of the preceding clauses, wherein the pipeline guide comprises two retaining surfaces which are located at a distance from each other at opposite ends of the guiding surface and extending traverse to the guiding surface.
25. Stinger according to any of the preceding clauses, wherein the guiding surface and the two retaining surfaces are formed by two surfaces extending traverse to each other.
26. Stinger according to any of the preceding clauses, wherein the stinger is configured and constructed to move the pipeline support along the track such that in use the pipeline guide is extending substantially perpendicular to the laying direction of the pipeline.
27. Stinger according to any of the preceding clauses, wherein the stinger is configured and constructed to move the pipeline support along the track such that in use the pipeline guide remains extending substantially perpendicular to the laying direction of the pipeline when the orientation of the pipeline laying vessel in a horizontal plane is changed.
28. Stinger according to any of the preceding clauses, wherein stinger is configured and constructed to move the pipeline support along the track such that in use the guiding surface is extending substantially perpendicular to the laying direction of the pipeline.
29. Stinger according to any of the preceding clauses, wherein the stinger is configured and constructed to move the pipeline support along the track such that in use the guiding surface remains extending substantially perpendicular to the laying direction of the pipeline when the orientation of the pipeline laying vessel in a horizontal plane is changed.
30. Stinger according to any of the preceding clauses, wherein the pipeline support comprises a line guide for guiding a line.
31. Stinger according to any of the preceding clauses, wherein the line guide comprises a line guiding surface which in use is in contact with the line.
32. Stinger according to any of the preceding clauses, wherein the line guiding surface is formed by a rotatable disc.
33. Stinger according to any of the preceding clauses, wherein the line guide is movable from a non-operative position into an operative position, and vice versa.

34. Stinger according to any of the preceding clauses, wherein the line is part of an abandoning and recovery (A&R) system.

35. Stinger according to any of the preceding clauses, wherein the stinger is configured and constructed to move the pipeline support along the track such that in use the line guiding surface is extending substantially perpendicular to the laying direction of the pipeline.

36. Stinger according to any of the preceding clauses, wherein the stinger is configured and constructed to move the pipeline support along the track such that in use the line guiding surface remains extending substantially perpendicular to the laying direction of the pipeline when the orientation of the pipeline laying vessel in a horizontal plane is changed.

37. Stinger according to any of the preceding clauses, wherein the tracks are located at a distance from each other along the firing line.

38. Stinger according to any of the preceding clauses, wherein the tracks are located in line with each other.

39. Stinger according to any of the preceding clauses, wherein the tracks are held in position by a base frame.

40. Stinger according to any of the preceding clauses, wherein each track defines a track centre.

41. Stinger according to any of the preceding clauses, wherein the track centres are positioned in line with each other.

42. Stinger according to any of the preceding clauses, wherein the distance (D-I) between the pipeline guide of an upper pipeline support and its track centre is smaller than the distance (D-II) between the pipeline guide of an lower pipeline support and its track centre.

43. Stinger according to any of the preceding clauses, wherein the distance (D-I) between the pipeline guide of an upper pipeline support and its track centre is smaller than the distance (D-II, D-III) between the pipeline guide of each lower located pipeline support and its track centre.

44. Stinger according to any of the preceding clauses, wherein the distance (D-I) between the guiding surface of an upper pipeline support and its track centre is smaller than the distance (D-II) between the guiding surface of an lower pipeline support and its track centre.

45. Stinger according to any of the preceding clauses, wherein the distance (D-I) between the guiding surface of an upper pipeline support and its track centre is smaller than the distance (D-II, D-III) between the guiding surface of each lower located pipeline support and its track centre.

46. Stinger according to any of the preceding clauses, wherein the pipeline support is configured and constructed to adjust the distance (D-I) between the pipeline guide and its track centre.

47. Stinger according to any of the preceding clauses, wherein the pipeline support is configured and constructed to adjust the distance (D-I) between the guide surface and its track centre.

48. Pipeline laying vessel comprising a stinger according to any of the preceding clauses.

49. Pipeline laying vessel according to clause 48, comprising a hull for providing buoyancy to the pipeline laying vessel and a tower assembly extending upwardly from the hull for supporting a part of the pipeline which is to be laid along the firing line.

50. Pipeline laying vessel according to any of the clauses 48-49, wherein the tower assembly in use extends substantially vertical.

51. Pipeline laying vessel according to any of the clauses 48-50, wherein the stinger is located at the lower part of the tower assembly.

52. Pipeline laying vessel according to any of the clauses 48-51, wherein the stinger and the tower assembly are positioned substantially in line with each other.

53. Pipeline laying vessel according to any of the clauses 48-52, wherein a pipeline is suspending from the pipeline laying vessel to the seabed.

54. Pipeline laying vessel according to any of the clauses 48-53, wherein the pipeline extends through the stinger.

55. Method for laying a pipeline with a pipeline laying vessel according to any of the clauses 48-54, comprising changing the orientation of the pipeline laying vessel in a horizontal plane while keeping the orientation of the pipeline substantially unchanged by moving the at least one pipeline support along its track.

56. Method according to clause 55, wherein the method comprises keeping the orientation of pipeline substantially unchanged by moving the pipeline supports along the tracks.

57. Method according to any of the clauses 55-56, wherein the method comprise moving the at least one pipeline support along its track such that the pipeline guide is extending substantially perpendicular to the laying direction of the pipeline.

58. Method according to any of the clauses 55-57, wherein the method comprise moving the at least one pipeline support along its track such that the guiding surface is extending substantially perpendicular to the laying direction of the pipeline.

59. Method according to any of the clauses 55-58, wherein at least one drive is used for moving the at least one pipeline support along its track.

60. Method according to any of the clauses 55-59, wherein the at least one pipeline support is moved along its track by the forces of the pipeline exerted on the pipeline support.

61. Use of a stinger according to any of the clauses 1-47.

62. Use of a pipeline laying vessel according to any of the clauses 48-54.

It will be clear that many modifications of the stinger, pipeline laying vessel and method according the invention are possible, without departing from the scope as defined in the accompanying claims.

The invention claimed is:

1. A stinger for a pipeline laying vessel, the stinger comprising:
   multiple tracks which in use at least partly surround a firing line along which the pipeline is laid; and
   multiple pipeline supports for supporting the pipeline by being placed in contact with the pipeline, which pipeline supports are movable along said tracks,
   wherein each track is formed by a rail at least partly surrounding the firing line, which rail is provided with one of the pipeline supports,
   wherein the rails are located at a distance from each other and held in position by a base frame, which base frame is not rotatable relative to the firing line, and
   wherein the stinger comprises a drive for driving the pipeline supports along their rail independent from the base frame.

2. The stinger according to claim 1, wherein the track fully surrounds the firing line.

3. The stinger according to claim 1, wherein the pipeline support is movable 360° around the firing line.

4. The stinger according to claim 1, wherein each rail comprises a first rail part and a second rail part which are movable relative to each other.

5. The stinger according to claim 1, wherein the stinger comprises a separate drive for each pipeline support.

6. The stinger according to claim 1, wherein the pipeline support is substantially freely moveable along the track.

7. The stinger according to claim 1, wherein the pipeline support comprise a pipeline guide for guiding the pipeline, and the pipeline guide comprises a guiding surface which in use is in contact with the pipeline.

8. The stinger according to claim 7, wherein the pipeline guide comprises two retaining surfaces which are located at a distance from each other at opposite ends of the guiding surface and extending traverse to the guiding surface.

9. The stinger according to claim 7, wherein the stinger is configured and constructed to move the pipeline support along the track such that in use the pipeline guide remains extending substantially perpendicular to the laying direction of the pipeline when the orientation of the pipeline laying vessel in a horizontal plane is changed.

10. The stinger according to claim 1, wherein the pipeline support comprises a line guide for guiding a line.

11. The stinger according to claim 10, wherein the line guide is movable from a non-operative position into an operative position, and vice versa.

12. The stinger according to claim 1, wherein each track defines a track centre, and the distance (D-I) between the pipeline guide of an upper pipeline support and its track centre is smaller than the distance (D-II) between the pipeline guide of a lower pipeline support and its track centre.

13. A pipeline laying vessel comprising a stinger according to claim 1.

14. The pipeline laying vessel according to claim 13, comprising a hull for providing buoyancy to the pipeline laying vessel and a tower assembly extending upwardly from the hull for supporting a part of the pipeline which is to be laid along the firing line.

15. The pipeline laying vessel according to claim 13, wherein the stinger is located at the lower part of the tower assembly.

16. A method for laying a pipeline with a pipeline laying vessel according to claim 13, comprising changing the orientation of the pipeline laying vessel in a horizontal plane while keeping the orientation of the pipeline substantially unchanged by moving the pipeline supports along their track formed by a rail.

17. The method according to claim 16, wherein at least one drive is used for moving the at least one pipeline support along its track.

18. The method according to claim 16, wherein the at least one pipeline support is moved along its track by the forces of the pipeline exerted on the pipeline support.

19. The stinger according to claim 1, wherein the stinger comprises a drive for driving multiple pipeline supports along their rail.

20. The stinger according to claim 1, wherein the stinger comprises a separate drive for driving each of the pipeline supports along its rail.

\* \* \* \* \*